United States Patent [19]

Shintani

[11] 4,269,486
[45] May 26, 1981

[54] MULTI-AXIS MOVABLE MIRROR DEVICE
[75] Inventor: Kenji Shintani, Tokyo, Japan
[73] Assignee: Sony Corporation, Tokyo, Japan
[21] Appl. No.: 109,072
[22] Filed: Jan. 2, 1980
[30] Foreign Application Priority Data Jan. 9, 1979 [JP] Japan ............................ 54-1962

[51] Int. Cl.³ ............................................. G02B 27/17
[52] U.S. Cl. ................................. 350/486; 369/44
[58] Field of Search ............... 350/6.5, 285; 358/199; 179/100.3 V

[56] References Cited
U.S. PATENT DOCUMENTS

| 4,011,003 | 3/1977 | Dragt | 350/285 |
| 4,021,096 | 5/1977 | Dragt | 179/100.3 V |
| 4,100,576 | 7/1978 | Ditthardt | 179/100.3 V |

FOREIGN PATENT DOCUMENTS 2531069 1/1976 Fed. Rep. of Germany ........... 350/285

Primary Examiner—R. A. Rosenberger
Attorney, Agent, or Firm—Lewis H. Eslinger; Alvin Sinderbrand

[57] ABSTRACT

A multi-axis movable mirror device includes a mirror, a flexible coupling to couple the mirror to a fixed member to allow the mirror to freely rotate about a plurality of axes, a bobbin integrally secured to the mirror, a number of coils wound on the bobbin at different locations and a number of sets of magnets opposing the coils wound on the bobbin. The mirror is rotated about selected axes by supplying control currents to selected coils.

5 Claims, 11 Drawing Figures

MULTI-AXIS MOVABLE MIRROR DEVICE

BACKGROUND OF THE INVENTION

1. Field of the Invention

This invention relates generally to multi-axis movable mirror devices and, more particularly, is directed to an improved multi-axis movable mirror device suitable for use in an optical device such as an optical scan video disc player or the like.

2. Description of the Prior Art

As will be more readily apparent in the following specification present two-axis movable mirror devices used in optical scan devices such as video disc players are low in sensitivity, are poor in reliability and are easily affected by vibration. In addition these prior art devices are easily damaged and the mirror has a tendency to become detached.

OBJECTS AND SUMMARY OF THE INVENTION

Accordingly, it is an object of the present invention to provide a multi-axis movable mirror device suitable for use in an optical scan device such as a video disc player which is high in sensitivity, good in frequency response characteristics, durable to withstand misalignment due to vibrations and to withstand any tendency for the mirror to become detached.

In accordance with an aspect of this invention, a multi-axis movable mirror device is provided for use with optical scan devices such as video disc recorders. The mirror is mounted by a flexible coupling allowing for movement of the mirror about multiple axes. A number of coils are provided wound about a bobbin connected to the mirror and a number of sets of magnets are provided in opposed relationship to each coil. Adjustment of the mirror position is obtained by supplying control currents to selected coils which react with the magnetic field of the magnets to cause the mirror to move correspondingly to obtain precise positioning of the mirror.

DETAILED DESCRIPTION OF THE PREFERRED EMBODIMENTS

Before turning to a description of the preferred embodiments of the present invention it is best to provide a general description of a video disc player on which the invention may be used and a description of certain prior art devices. In this way the problems associated with the prior art devices may be more readily apparent and the advantages of the device of the present invention more readily appreciated.

Figure 1:
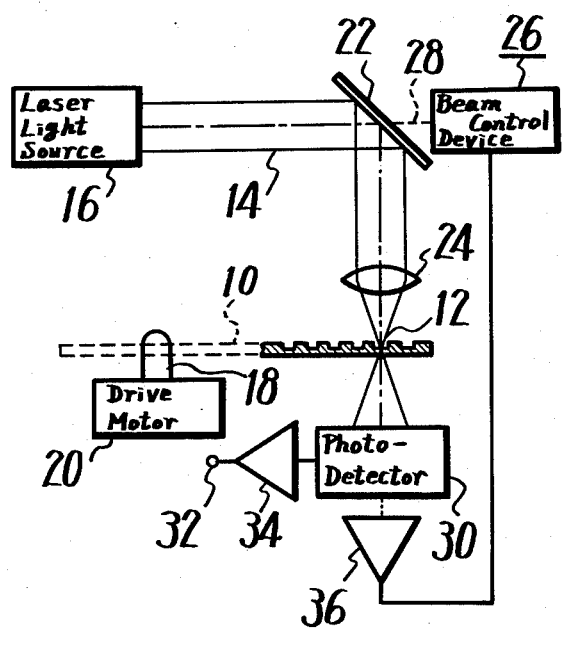
FIG. 1 is a block diagram of an optical video disc player.

Turning first to FIG. 1 there is shown a video disc player which reads out information from a video disc 10 by tracing a record track 12 on the video disc 10 with an optical energy beam, for example a coherent light beam 14 emitted from a laser light source 16. The disc 10 is a recording medium made of a suitable material such as polyvinyl chloride on which program information can be recorded. Typically, disc 10 is made of a transparent material and the program is recorded on the surface of the disc 10 in a helical track 12, for example by pressing.

As described above, the picture or video information is recorded on track 12 in the form of continuous recesses, i.e. pits and projection lands, in which the time variation of a carrier wave, which is frequency-modulated, appears as a special representation. Therefore, track 12 has a constant width but the lengths of its pits and lands are varied so as to form the special representation.

The video disc 10 is formed in a sufficiently thin sheet so as to be freely flexible and in use is engaged with a shaft 18 of a drive motor 20 by a latching hub (not shown). Disc 10 is rotated at a speed of 1800 rpm, which rotation speed is peculiar to the video disc player reproduction system.

The read-out light beam 14 is projected along a path which includes an optical element 22 in the form of a tracking adjustment mirror. Mirror element 22 changes the direction of the light beam 14 to focus it on an objective lens 24. Lens 24 functions to focus light beam 14 onto track 12 of video disc 10. As will be clear from the following detailed description, mirror 22 can be adjusted about a pair of axes which are at right-angles to each other, for example the x—x axis and y—y axis (FIG. 2) of a beam control device 26. Beam control device 26 in the prior art devices is mechanically coupled to mirror 22, and this mechanical coupling is shown by a broken line 28 in FIG. 1. When mirror 22 has been adjusted, it will be apparent that the advancing direction of the read-out light beam 14 is changed to compensate for the tracking error in the radius direction of the disc 10 and, also, for the timing error in the track direction.

As described above, it is assumed that video disc 10 is transparent. Therefore, a photo-detector 30, which is located under disc 10 in the beam advancing direction, is provided to sense the light beam passed through disc 10. Photo-detector 30 comprises a plurality of photo-cells which convert intensity variations in the light into electric current variations and, hence, delivers the information recorded on disc 10 as an electrical signal which is then delivered through an amplifier 34 to an output terminal 32.

The photo-detector 30 further includes a circuit which will differentially couple output signals delivered from selected photo-cells thereof and produce a tracking error correction signal which is necessary to compensate for the tracking irregularity of the light beam in the radius direction of the disc 10. The matrix in the photo-detector 30 is utilized to pick up a pilot signal contained in a read-out information signal on record disc 10 and, hence, a timing error correction (time base correction) signal having an amplitude and polarity representing a timing error in the track direction is also produced by photo-detector 30.

In the alternative, it is possible to derive the time base correction signal from a phase comparison device which compares the phase of a horizontal synchronizing signal contained in the read-out information signal with the phase of a reference signal generated from a quartz controlled oscillator of, for example, 3.58 MH$_z$ which is provided in the video disc player. This phase comparator will produce a correction signal having a polarity which determines the direction of the time base error (either advanced or delayed) and an amplitude which indicates the magnitude of the time base error.

In either case, the tracking error signal and time base correction signal are supplied from photo-detector 30 through an amplifier 36 to energize beam control device 26. Energization of beam control device 26 selectively positions mirror 22 with respect to the x—x and y—y axes depending on the correction signal received.

In order to read out all segments of the track 12, under the assumption that the tracking registration of light beam 14 is maintained, i.e. where no tracking error is detected, it is necessary that read-out beam 14 is continuously moved at a constant speed in the radius direction of disc 10 so as to scan and, hence, read out the recorded information from the first to last track 12 of the disc 10 continuously and without interruption. In order to move beam 14 in the radius direction of the disc 10 a transfer base or carriage must be provided which will move mirror 22, lens 24, photo-detector 30 and beam control device 26 in the radius direction of the disc 10.

Figure 2:
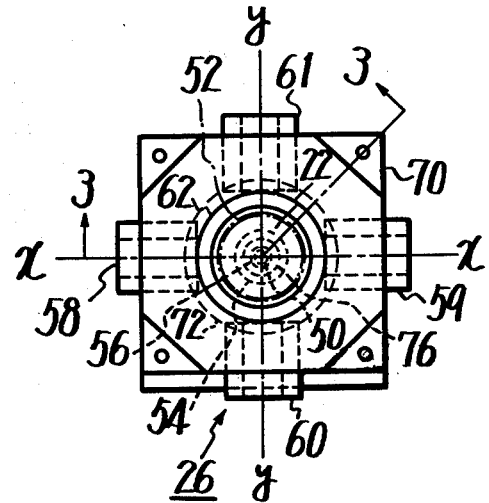
FIGS. 2, 3 and 4 are a plan, vertical cross-sectional and a front view, respectively, of a prior art two-axis movable mirror device which may be used in the optical video disc player depicted in FIG. 1.
Figure 3:
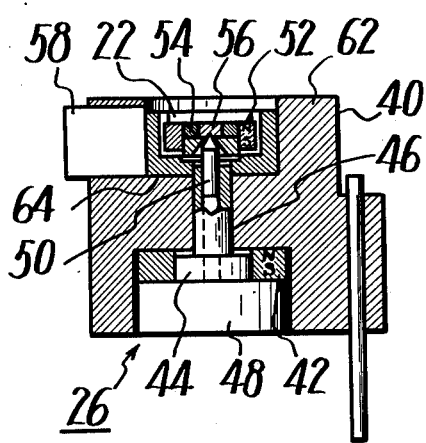

A prior art beam control device 26, which responds to the above described tracking error correction signal and time base correction signal, will be now described in detail with reference to FIGS. 2 and 3. As shown in FIGS. 2 and 3, beam control device 26 comprises a housing 40 with a hollow space therein in which a first ring magnet 42 is accommodated. Ring magnet 42 has its magnetic poles in the axial direction, as indicated by N-S poles in FIG. 3, and is supported by a flanged leg portion 44 of a post 46. Post 46 is located through the center of housing 40 and leg portion 44 of post 46 is held within housing 40 by a plug 48. Plug 48 pushes leg portion 44 and magnet 42 against an inner wall portion within housing 40. At the upper end of post 46 is provided a support pin 50, preferably made of tungsten, having a tip end terminating in a sharp pointed end projecting in the axial direction of post 46. Pin 56 cooperates with a bearing described in more detail hereinafter.

A second ring magnet 52, smaller in diameter than magnet 42 and with the same polarity is provided in the upper end of housing 40. Ring magnet 52 has a cone guide 54 in its center bore and a pivot bearing 56, which is a hard bearing stone having a recess for receiving the sharp pointed end of pin 50. As shown in FIG. 3, guide 54 and bearing stone 56 are located coaxially so that the pointed tip end of pin 50 can easily engage within the recess of bearing stone 56. This construction permits magnet 52 to pivot universally about pointed tip 50 while precluding magnet 52 from any transverse movement. Due to the above described construction a floating magnetic field is established between magnets 42 and 52 and between the tip end of pin 50 and a part coaxially near magnet 42 whereby magnet 52 is maintained on pin 50 by magnet 42. However, since magnet 52 may pivot with respect to the perpendicular axes x—x and y—y it can be moved into an inclined state.

Although there is not shown any means to adjust the axial spacing between magnets 42 and 52, if this adjustment is required it may be done in any convenient manner.

In the prior art device shown in FIGS. 2 and 3, tracking mirror 22 which is located in the incident path of beam 14, is mechanically bonded to magnet 52 by a suitable adhesive agent, such as a cement or the like, and mirror 22 pivots or swings together with magnet 52. With mirror 22 positioned as shown in FIG. 1, it is apparent that mirror 22 changes the direction of the optical path of read-out beam 14 to permit beam 14 to scan track 12 with no tracking or time base error in accordance with the command of the error correction signals as will be described hereinafter.

In order to maintain proper tracking, beam control device 26 includes an electro-magnetic mechanism which is located near magnet 52 and tracking mirror 22 and along the respective right-angled axes x—x and y—y. The electro-magnetic mechanism includes a first pair of deflection coils 58, 59 which are located in the axial direction along the x—x axis and a second pair of deflection coils 60, 61 which are similarly located along the y—y axis as shown in FIG. 2.

In the following explanation it is assumed that the x—x axis coincides with the radius direction of disc 10 at the point where track 12 is read out while the y—y axis coincides with a tangent to track 12 at the point where track 12 is read out. Accordingly if mirror 22 pivotally rotates with respect to the x—x axis read-out beam 14 is moved in parallel with the y—y axis whereby the timing error i.e. time base error can be corrected. On the other hand, if mirror 22 pivotally rotates with respect to the y—y axis, beam 14 is moved in parallel with the x—x axis to make it possible to correct any tracking error in the radius direction of disc 10.

As shown in FIG. 2, each of the deflection coils 58 to 61 comprises an air-core coil (refer to FIG. 4) with each of the coils forming the pairs arranged in the axial direction in an opening formed in housing 40. In order to increase the sensitivity, the respective coils 58 to 61 are located as close as possible to a damper 62 surrounding magnet 52.

Figure 4:
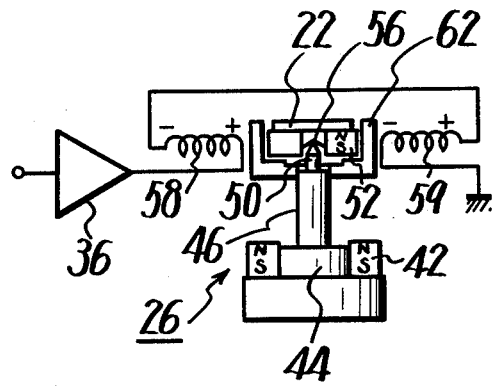

As shown in FIG. 4, coils 58 and 59 located along the x—x axis are connected in series and the direction of their magnetization is predetermined so that when they are energized by a tracking error correction signal amplifier 36 the induced magnetic field originated by the coils 58 and 59 has a direction and intensity determined by the polarity and amplitude of the applied correction signal. This induced magnetic field reacts to the magnetic field originated by magnet 52 and, hence, magnet 52 and mirror 22 bonded thereto are pivotally roated about the y—y axis, which is perpendicular to the plane of the paper as shown in FIG. 4, to a degree proportional to the received signal. Thus, read-out beam 14 correctly scans track 12.

In like manner, when coils 60 and 61 are energized by a timing error correction signal, the magnetic field induced thereby reacts with magnetic field of magnet 52 and, hence, magnet 52 and mirror 22 are pivotally rotated about the x—x axis so as to deflect read-out beam 14 in a direction to correct the detected timing error. Since circuit construction of coils 60 and 61 and the operation mode thereof are the same as those of coils 58 and 59, the description and illustration of coils 60 and 61 similar to FIG. 4 is omitted.

With the system described above it is evident that since it is difficult to mechanically control the damping of the optical video disc player it is easily influenced by undesired mechanical vibration. This mechanical vibration causes magnet 52 and mirror 22 to deflect and shift at random from pivot pin 50 due to vibrations. Thus, in order to damp and prevent this vibration or shift of the magnet and mirror the damper mechanism is provided. This damper mechanism consists of a cup or annular-shaped ring 62 having a bore at its bottom, which is located adjacent magnet 52. As shown in FIG. 3, ring 62 is supported on a platform 64 formed in housing 40 and is located near magnet 52 and surrounds magnet 52. The damping characteristics of damper ring 62 are determined by the manner ring 62 is located near the assembly of magnet 52 and mirror 22. However, when magnet 52 and the mirror 22 carry out the desired pivoting about the pin 50, it is necessary that ring 62 be spaced from magnet 52 so as not to cause any contact between magnet 52 and ring 62. The shape of the ring 62 is selected such that it can achieve the symmetrical damping operation with respect to both the x—x and y—y axes.

In the alternative it is also apparent that if a conductor member or members which are not ring-shaped and which intersect the x—x and y—y axes are suitably located near the deflection coils 58, 59, 60 and 61, the above described symmetrical damping operation can also be carried out in substantially the same manner.

Electro-magnetic deflection coils 58, 59 and 60, 61 are positioned within housing 40 to insure that there is no electrical contact between the coils and ring 62. Ring 62 may be made of, for example, copper or any other material which has no ferro-magnetism but which has electrical conductivity.

When damper ring 62 is assembled as shown in FIGS. 2 and 3 it is located within the magnetic lines of force of the magnetic field of magnet 52. Accordingly, if magnet 52 moves the magnetic field originating therefrom also passes through ring 62. Thus, eddy currents will be induced in ring 62 in accordance with the variation of the vibrating magnetic field from magnet 52. These induced eddy currents induces an electro-magnetic force which will react to the magnetic field from the magnet 52 or act counter to it. The reaction between the induced electro-magnetic field and the magnetic field from the magnet 52 functions to suppress undesired vibration of magnet 52 which will be generated by mechanical resonance and thereby cancel mechanical vibration.

Accordingly, any vibration of the assembly consisting of magnet 52 and mirror 22 causes eddy currents in the conductor which forms damper ring 62 and, hence, induces an electro-magnetic force. This force is, in fact, in proportion to the vibration velocity of the magnet-mirror assembly, i.e. the variation of the magnetic field from magnet 52. Since the vibration velocity of the magnet-mirror assembly due to mechanical resonance is very high, the electro-magnetic force induced in damper ring 62 is correspondingly relatively strong. However, where a correction signal is supplied to coils 58, 59 or 60, 61 and the magnet-mirror assembly is displaced accordingly to correspond to the desired correction, this displacing velocity, i.e. vibration velocity of the assembly, is much lower as compared with the vibration velocity of the mechanical resonance. Thus, the induced electro-magnetic force is correspondingly relatively small. Accordingly, the undesired vibration of the magnet-mirror assembly due to mechanical resonance can be damped without hindering a desired low speed displacement of the assembly.

However, the two-axis movable mirror device consisting of the mirror 22 and beam control device 26 is very low in sensitivity and, because the mirror assembly is pivotally supported by a pin 50, it is easily affected or damaged by vibration, is poor in reliability and the mirror 22 is easily detached.

Figure 5:
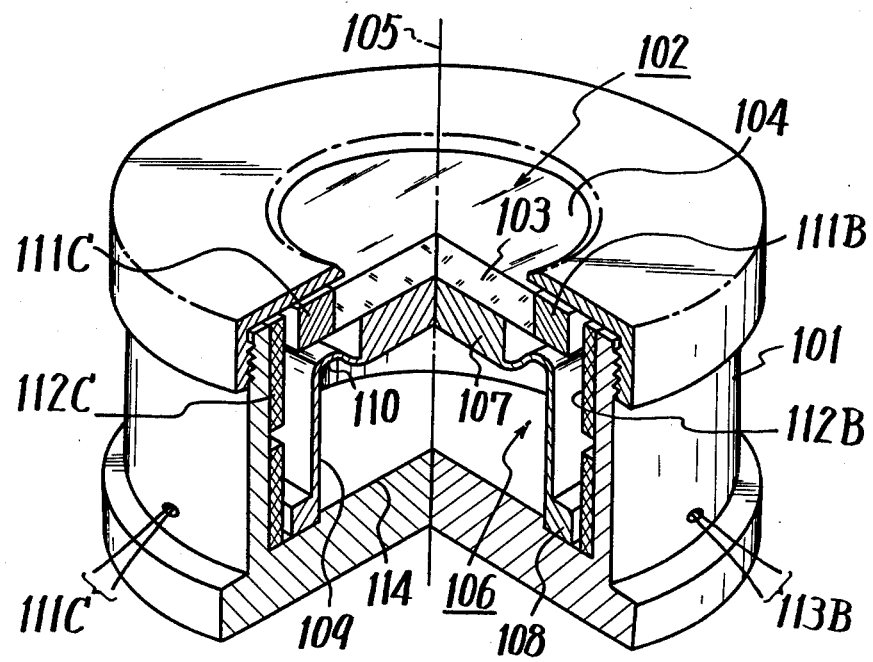
FIGS. 5 and 6 are a partial perspective and partial plan view, respectively, of another embodiment of a prior art two-axis movable mirror device.
Figure 6:
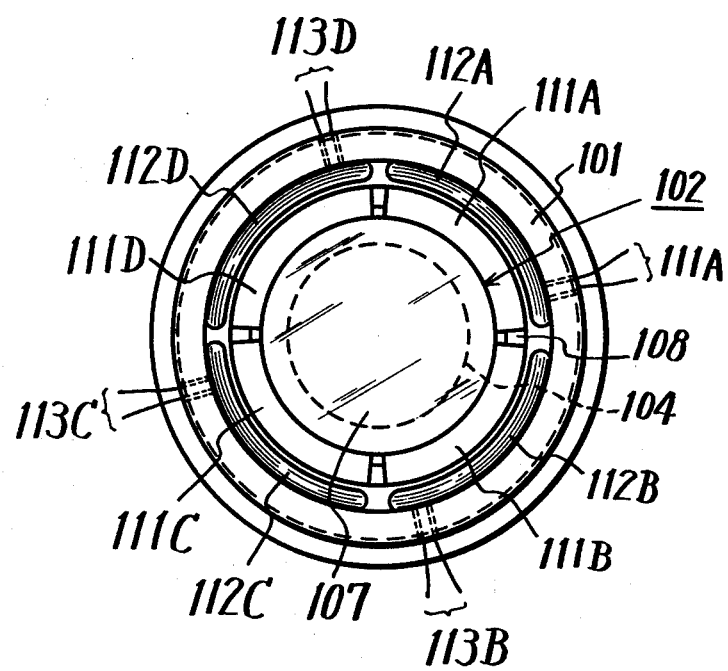

A prior art two-axis movable mirror device, which is free of the above defect, will now be described with reference to FIGS. 5 and 6. In this embodiment 101 designates a cylindrical frame having a flanged shaped bottom plate and a mirror 102 which is movably supported by the frame 101. Mirror 102 is made of a ceramic substrate 103 and a reflection layer 104 coated on the ceramic substrate 103 and is rotatably located about respective axes which are perpendicular to an optical axis 105 coincident with the axis of frame 101. Mirror 102 is attached to frame 101 through a resiliently deformable sealed bellows 106 which has a portion 107 secured to mirror 102, a flange portion 108 secured to frame 101 and a symmetrical bellow element 109 of resilient plastic material disposed between the portions 107 and 108 and integral therewith. Bellow element 109 has a ring-shaped bent portion 110 coaxial with axis 105.

Around the mirror 102 are fixed four permanent magnets 111a, 111b, 111c and 111d, and corresponding thereto there are provided four control coils 112a, 112b, 112c and 112d, respectively. The respective control coils are connected through terminals 113a, 113b, 113c and 113d, respectively, to a control circuit (not shown).

Bellows 106 is made of a suitable resilient material such as a rubber-like plastic. Portion 107 of bellows 106 secured to mirror 102 is formed in a disc-shape so as to be easily secured to mirror 102. Bellows 106 is coupled to frame 101 in such a manner that flange portion 108 of bellows 106 is coaxial with a central projection 114 of frame 101 and is secured to frame 101. Flange portion 108 is axially spaced apart from disc 107 and is coupled through the cylinder bellow member 109 to disc 107.

The above described two-axis movable mirror device, while avoiding the problem of detachment of the mirror suffers from other defects. This is, since the mirror and fixed permanent magnets are of relatively great mass and must be moved by the bellow element, the sensitivity is not very high and thus, this device is poor in frequency response characteristics.

The problem inherent in the above-described prior art devices are overcome by the present invention, one embodiment of which will be described with reference to FIGS. 7 to 9. The multi-axis movable mirror device of this embodiment may be used in an optical video disc player and also specifically may be used in, for example, the player shown diagrammatically in FIG. 1.

Figure 7:
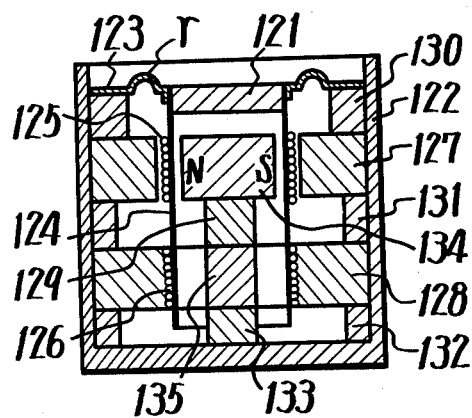
FIGS. 7 through 10 are a vertical cross-sectional, plan, transverse cross-sectional and a diagrammatic view, respectively, of one embodiment of the multi-axis movable mirror device of the present invention.
Figure 8:
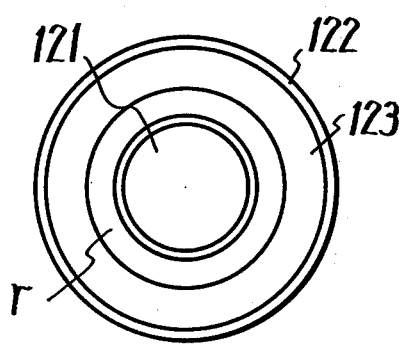
Figure 9:
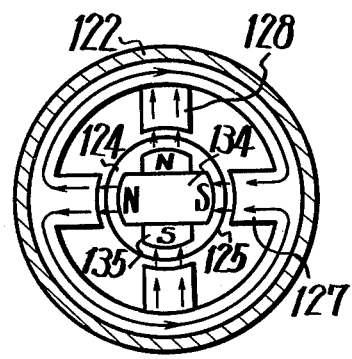

With reference to FIGS. 7 to 9, a cylindrical case 122 is provided having a closed bottom and an open upper end. A mirror 121 of a disc shape has an upper reflecting surface and is secured to case 122 through a resilient flexible coupling member 123 such that mirror 121 is rotatable about a plurality of axes including the two perpendicularly disposed axes described hereinafter. Coupling member 123 is made of, for example, an annular urethane sheet which has an annular bent portion (a rolled edge) r as shown in FIG. 7. The inner edge of coupling member 123 is bonded to the outer periphery of mirror 121 and the outer edge of coupling member 123 is bonded to the upper surface of an annular block 130 which is located in the vicinity of the opening of case 122 on the inside thereof.

A cylindrically shaped bobbin 124 is secured, for example by bonding, at one end to the outer periphery of mirror 121. A plurality of coils, for example two coils 125 and 126 illustratively shown in this embodiment of the present invention, are wound on bobbin 124 at different positions and each coil is supplied with different control currents, respectively. A plurality of sets of magnets, for example two permanent magnets 134 and 135 illustratively shown in this embodiment of the present invention, are provided for coils 125 and 126, respectively. While permanent magnets are shown it is apparent that electro-magnets may also be used. In the illustrated embodiment magnets 134 and 135 are bar magnets having round ends and are connected together through a spacer 129. The magnets are oriented to be perpendicular to each other as shown in FIG. 9. Lower magnet 135 is disposed through a block 133 which is fixed to the bottom of case 122. In this way, magnets 134 and 135 are positioned in bobbin 124 to oppose the coils 125 and 126, respectively.

Annular yokes 127 and 128 are respectively provided for magnets 134 and 135 and are located outside bobbin 124. Each yoke 127 and 128 has a pair of projections with round inner surfaces opposing both of the magnetic poles of each of the magnets 134 and 135. Yokes 127 and 128 are connected together through an annular spacer 131 and lower yoke 128 is fixed through an annular block 132 to the bottom of case 122 and the upper surface of yoke 127 is secured to annular block 130. Yokes 127 and 128 form the magnetic paths for magnets 134 and 135, respectively, and through the magnetic paths thus formed magnetic flux passes as indicated by the arrows in FIG. 9.

Figure 10:
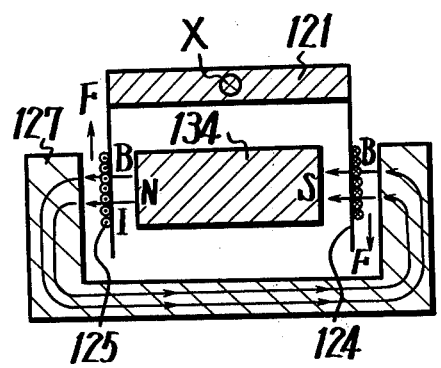

Turning now to FIG. 10, the operation of the above described movable mirror device of this invention will be explained. FIG. 10 shows mirror 121, bobbin 124, coil 125, permanent magnet 134 and yoke 127 of the movable mirror device shown in FIGS. 7 to 9 in a somewhat enlarged scale. A magnetic flux B which originates from magnet 134 circulates through yoke 127 as shown in FIG. 10. When a control current I flows through coil 125, in the direction shown in FIG. 10, coil 125 and, accordingly, bobbin 124 are subjected to a force F. Hence, mirror 121 is rotated, in the clockwise direction as viewed in FIG. 10, about an axis X. The angle and direction of rotation of mirror 121 depends upon the magnitude and direction of the control current I flowing through coil 125. Similarly, though not shown, in accordance with the magnitude and direction of a control current flowing through the coil 126, mirror 121 will rotate about an axis perpendicular to axis X.

Figure 11:
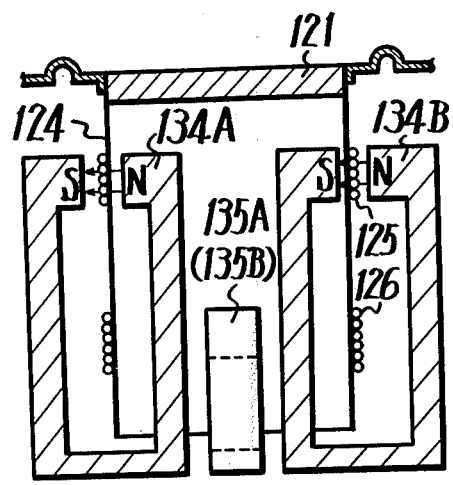
FIG. 11 is a vertical cross-sectional view of the essential feature of an alternative embodiment of the movable mirror device of the present invention.

FIG. 11 shows another embodiment of the present invention. In this embodiment, a pair of U-shaped magnets 134a and 134b are provided each of which has magnetic poles, as indicated in in FIG. 11, between which coil 125 wound on bobbin 124 is located. Similar magnet pairs 135a and 135b are provided for coil 126. In this embodiment the U-shaped magnets take the place of the bar magnet and yoke so that the magnetic flux flows between magnet poles. In all other respects this embodiment is the same as the embodiment of FIGS. 7 to 9. Thus, the case, flexible coupling spacers, and so on are omitted from FIG. 11 but it will be apparent that they could be of constructions similar to those of the embodiment shown in FIGS. 7 to 9.

While the present invention has been illustrated as a two-axis movable mirror device it is appreciated that because mirror 121 is mounted on a flexible coupling it has the ability to tilt or move in any direction. Thus, by using additional coils and magnet systems to those shown it is apparent that the mirror can be tilted or rotated about more than two axes.

It is also readily apparent that the multi-axis movable mirror device of the present invention provides greater stability, so as to be more immune to misalignment due to vibrations, yet highly sensitive so as to be very responsive to correction signals so as to be precisely positioned to provide accurate tracking.

What is claimed is:

1. A mirror device movable about multiaxes comprising
   a housing,
   a mirror member,
   flexible connection means for flexibly supporting said mirror within said housing with its reflective side facing outwardly of said housing and wherein said mirror is universally pivotable about a plurality of axes,
   said flexible connection means comprising an annular sheet of flexible material bonded to the outer periphery of said mirror and to an interior surface section of said housing,
   said flexible connection means further including an annular corrugated segment therein disposed between said mirror and said housing to provide a platform for said mirror allowing for universal tilting movement of said mirror with a high degree of sensitivity and frequency response,
   a bobbin operatively associated with said mirror and disposed within said housing,
   a first coil member wound on said bobbin within said housing adapted to be supplied with a first control current,
   a second coil member wound on said bobbin within said housing spaced from said first coil member and wound separately from said first coil member adapted to be supplied with a second control current,
   first and second magnetic circuit means fixed in said housing adjacent said first and second coil members, respectively, whereby current flow in either of said first or second coil members reacts with said respective magnetic circuit means to induce a force tending to pivot said bobbin and mirror member.

2. A movable mirror device according to claim 1 wherein said mirror member is circular in shape and said flexible connection means is formed in a ring shaped sheet of flexible material.

3. A movable mirror device according to claim 1 wherein said first and second magnetic circuit means each comprise a permanent magnet member disposed within said bobbin adjacent a respective coil and a yoke member outside said bobbin disposed adjacent a respective coil whereby said magnetic circuit means is formed by each said magnet and its respective yoke member.

4. A movable mirror device according to claim 3 wherein the direction of magnetic polarization of said first and second permanent magnets are at right angles to each other.

5. A movable mirror device according to claim 1 wherein said first and second magnetic circuit means each comprise a pair of permanent magnets disposed adjacent a respective first and second coil member on each side of said bobbin.

* * * * *